(12) United States Patent
Wolters et al.

(10) Patent No.: US 7,047,717 B1
(45) Date of Patent: May 23, 2006

(54) AGRICULTURAL HEADER WITH CHOPPER

(75) Inventors: Norbert Wolters, Gescher (DE); Richard Wübbels, Rhede (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 871 days.

(21) Appl. No.: 09/721,512

(22) Filed: Nov. 22, 2000

(30) Foreign Application Priority Data

Dec. 9, 1999 (DE) ................. 199 59 282

(51) Int. Cl.
*A01D 45/02* (2006.01)
(52) U.S. Cl. .......................................... 56/60
(58) Field of Classification Search ................. 56/12.4, 56/12.5, 16.9, 17.3, 51, 52, 53, 62, 330, 500, 56/503

See application file for complete search history.

(56) References Cited

U.S. PATENT DOCUMENTS

| | | | | |
|---|---|---|---|---|
| 3,472,299 A | * | 10/1969 | Vyaznikov | 56/62 |
| 3,984,966 A | * | 10/1976 | Outtier | 56/503 |
| 4,148,175 A | * | 4/1979 | Miller | 56/14.4 |
| 4,236,369 A | * | 12/1980 | Decoene | 56/60 |
| 4,341,062 A | * | 7/1982 | Scudder | 56/330 |
| 4,566,256 A | * | 1/1986 | Sousek | 56/10.2 R |
| 5,330,114 A | * | 7/1994 | Trenkamp et al. | 56/60 |
| 5,722,225 A | * | 3/1998 | Wuebbels et al. | 56/60 |
| 5,787,696 A | | 8/1998 | Wiegert et al. | 56/104 |
| 6,032,444 A | * | 3/2000 | Herron et al. | 56/503 |
| 6,073,429 A | * | 6/2000 | Wuebbels et al. | 56/11.3 |
| 6,298,643 B1 | * | 10/2001 | Wuebbels et al. | 56/503 |

FOREIGN PATENT DOCUMENTS

| | | |
|---|---|---|
| AT | 3 01 234 | 8/1972 |
| DE | 25 49 136 | 5/1977 |
| DE | 38 44 734 | 8/1991 |
| DE | 197 34 747 | 2/1999 |
| EP | 423626 A1 * | 4/1991 |
| EP | 1000533 A1 * | 11/1999 |
| FR | 74 965 | 6/1961 |
| FR | 2 599 931 | 12/1987 |
| WO | WO 99/03323 | 1/1999 |

* cited by examiner

*Primary Examiner*—Árpád Fábián Kovács (57) ABSTRACT

A feeding and picking device is provided with a rotating feeding device defining a feeding radius. The feeding device is rotated about a vertical feeding axis. The picking device comprises a snapping channel formed by snapping bars under which is located at least one snapping roll. A chopping device is located beneath the picking device. The chopping device defines a chopping radius that overlies the feeding radius of the feeding device. The chopping device is rotated about a vertical axis.

21 Claims, 13 Drawing Sheets

AGRICULTURAL HEADER WITH CHOPPER

BACKGROUND OF THE INVENTION

1. Field of the Invention

The present invention is directed to a feeding and picking device for an agricultural crop having a chopper for chopping crop material separated by the picking device.

2. Description of the Prior Art

U.S. Pat. No. 3,333,405 discloses a well-known corn picker head device which is fitted with a cutting unit. The corn picker head device comprises reciprocating knives and a conveyer screw downstream of the cutting unit. The conveyer screw interacts with a floor consisting of pairs of counterrotating rollers, between which openings are provided which run at right angles to the direction of travel. A conveyer screw feeds the ears of corn to a combine harvester, and the stalks of the corn plants are drawn in by the rotating rollers, guided through the openings, and deposited on the ground of the field. In practice, however, this device proved to be a failure.

German Patent No. 197 34 747 A discloses a corn picker for attachment to a self-propelling harvesting machine which is able to mow stalks in fields not planted in rows and to pick the ears of corn from the plants to process them separately from the remainder of the plants. To be able to grasp and mow the plants in fields not planted in rows, the device comprises a mowing unit with a rotating drum, on the peripheral edges of which recesses are provided, and a knife that rotates underneath this drum, such as known from corn picker heads. The plants are subsequently fed to conventional picker units that are mounted downstream of the mowing unit, such picker units are disclosed in German Patent No. 30 29 424 A. Although this device is able to work in fields not planted in rows, it has the disadvantage that it requires complex technical equipment. The chopper and picking device are located downstream from the feeding device thereby increasing the relative length unit.

SUMMARY

It is an object of the present invention to provide a relative compact feeding and picking device having a chopper for chopping plant stalks separated from the useful parts of the plant by the picking device.

The feeding and picking device comprises a feeding element which grasps the plants and feeds them to the picking device. The feeding element is designed to work in fields not planted in rows and is thus able to draw in plants over a relatively large lateral working width. The picking device removes the useful parts of the plant, such as ears of corn, and transports the remainder of the plant to the chopping device. The size of the remainder of the plant is reduced by the chopping device which is located downstream—as a rule, beneath—the picking device. The basic idea of the present invention is to have the chopping radius of the chopping device and the feeding radius of the feeding device overlap. Thus, the chopping radius intersects the feeding radius. This feature affords a number of advantages which will be explained in greater detail below: First, it ensures a compact design. In addition, the chopping device and the feeding device are able to interact during the chopping process in such a way that the feeding device acts as a counterknife. As an alternative, or in addition thereto, the chopping knife can also serve as a mowing knife.

In a preferred embodiment of the present invention, while cutting the plant into pieces, the feeding element serves as a counterknife. In this particular embodiment, the feeding element is generally mounted beneath the chopping device. It holds and supports the plant at least during the first cut and, as a rule, also during the subsequent cutting steps since the plant is fed back by the picking device and thus again comes to lie close to the feeding device unless it has already been cut into pieces by the chopping device. Since the plant is gradually pushed forward when it is inside the picking device which holds it, the chopping device generally also interacts with the picking device. This configuration provides a feeding and picking device having an improved chopping action.

It is possible for the chopping device to be mounted in a number of alternative positions:

First, the chopping device can have a chopping radius which extends throughout the length of the picking device. Thus, the plant is gradually drawn in, generally downward, by the stalk rollers of the picking device and is cut into pieces by the chopping device after it leaves the picking device. The advantage is that the length of the chopped parts of the plant is substantially constant, which is achieved by the continuous forward thrusting drive of the stalk rollers.

Secondly, in a particularly useful embodiment of the present invention, the chopping device is mounted in a way to ensure that the plant, shortly after it has been grasped by the feeding element (or even before), is cut off at ground level. The chopping radius of the chopping device thus extends to an area upstream of the picking device and can encompass a relatively large width. During the subsequent transporting steps, the plant can be transported into random directions, without making it necessary to bend the upper parts of the plant relative to its root. Due to the mass moment of inertia of the plant, there is no risk that the plant can fall over if it is processed rapidly by the feeding and picking device. The chopping device also acts on plants which have not yet entered into the picking device but which are still upstream thereof. The chopping device cuts the plant off at ground level, and subsequently, other parts of the plant are cut into pieces since the force of gravity causes the plant to drop down into the chopping device if it is not supported in some manner.

When the chopping device (at least approximately) shares an axis with a feeding element of the feeding device, the plant is processed by the chopping device already upstream of the picking device. The chopping axis of the chopping device can also be located on an imaginary straight line which runs parallel to the direction of forward travel and which intersects with the feeding axis of the feeding device. The chopping axis can be located in front of the feeding axis or behind the feeding axis.

As an alternative, the chopping device can act upon the plant only in the rear end region of the picking device, i.e., relative to the direction of forward travel of the feeding and picking device, it can be mounted on the rear end of the picking device. Thus, the plant remains intact as it passes through the length of the picking device and is processed by the chopping device only after it has reached the rear end of the picking device. One advantage of this design is that the plant—which is still intact but no longer has the useful parts attached to it—is pushed forward or pulled through the picking device by the lower feeding element of the feeding device which is mounted beneath the picking device.

Furthermore, an upper feeding element of the feeding device can be mounted above the picking device and serve to grasp the plant and to feed it into the picking device. In addition, the lower feeding element can be mounted beneath the chopping device and the upper feeding element.

As already described above, the feeding device is fitted with at least one feeding element which grasps the plants and transports them to the picking device. It is possible to use a plurality of feeding elements that are mounted on top of one another. The chopping device can comprise a chopping knife that is mounted underneath or above the lower feeding element. As an alternative, two chopping knives that are mounted on top of each other can be used, one of which is located above and one underneath the lower feeding element.

Furthermore, it is proposed that the feeding element(s) transport grasped plants throughout the effective length of the picking device. As a result, the chain conveyers with attached grippers that had been used in prior art can be omitted, thus ensuring a compact construction of the feeding and picking device.

It has been found useful if the upper feeding element of the feeding device has a leading surface with a rejecting transporting action and a trailing surface with an aggressive transporting action. This type of transporting action can be achieved by outward projecting fingers of the feeding element, which fingers are curved into the opposite direction relative to the direction of rotation. The leading surface with the rejecting transporting action ensures that parts of the plant, in particular stalks, that come into contact with it are transported to the outside. Subsequently, they come into contact with the trailing surface which draws them toward the inside. Thus, the stalks of the plant come to lie against a trailing surface of the feeding element and are transported as a result of the gravity-induced pitching moments which develop as the feeding element rotates. The plants are therefore fed to the picking device while they are in a slightly tilted but substantially upright position.

The chopping device is preferably equipped with a chopping knife, the chopping axis of which runs at least approximately parallel to the feeding axis of the feeding device. As a rule, these axes of rotation are approximately vertical.

The chopping device can rotate in a clockwise or counterclockwise chopping direction. As a rule, the direction of rotation is selected to ensure that the cut-off parts of the plant are hurled into the direction desired, thus, for example, relative to the direction of forward travel of the feeding and picking device to the rear or to the side.

As to the design of the chopping knife of the chopping device, a number of alternatives are available. The chopping knife can have only one edge so that only the edge leading in the direction of rotation is sharp. It is also possible to use double-edged chopping knives which, can be turned once the leading edge has become blunt so that subsequently a heretofore unused sharp edge interacts with the plants. On the other hand, these double-edged chopping knives can be useful when reversing where the rear edge of these chopping knives can chop potentially jammed plants; in fact, it is this rear edge that actually makes it possible for the direction of rotation to be reversed.

It is also possible to provide a rigid mounting for the chopping knives or to suspend them so that they oscillate. The second alternative just mentioned has the advantage that damage caused by potentially invading foreign bodies are not as severe.

The chopping knife may cut by hacking or by slicing. The hacking cut has the advantage that during cutting, a momentum is imparted to the parts of the plant that are to be separated, which transports them away from the chopping device. A slicing cut, on the other hand, promises to produce smoother cut edges.

It is also possible to use smooth chopping knives or splicing knives which have a serrated cutting edge.

If the chopped remainder of the plant is to be deposited on the ground to be subsequently gathered by a suitable machine, one possibility is to deposit the chopped remainder in a windrow. To be able to do so, it is proposed that a suitable guiding mechanism be used, which grasps the separated parts of the plant and deposits them in a windrow. If a feeding element that is mounted underneath the chopping device is used, it is useful if the guiding mechanism is mounted between this feeding element and the chopping device.

The feeding and picking device is intended for use in crop harvesting machines. This type of crop harvesting machine, also called corn picker, serves to harvest crops, such as corn and sunflowers, the useful components of which must be separated from the rest of the plant.

DETAILED DESCRIPTION

Figure 1:
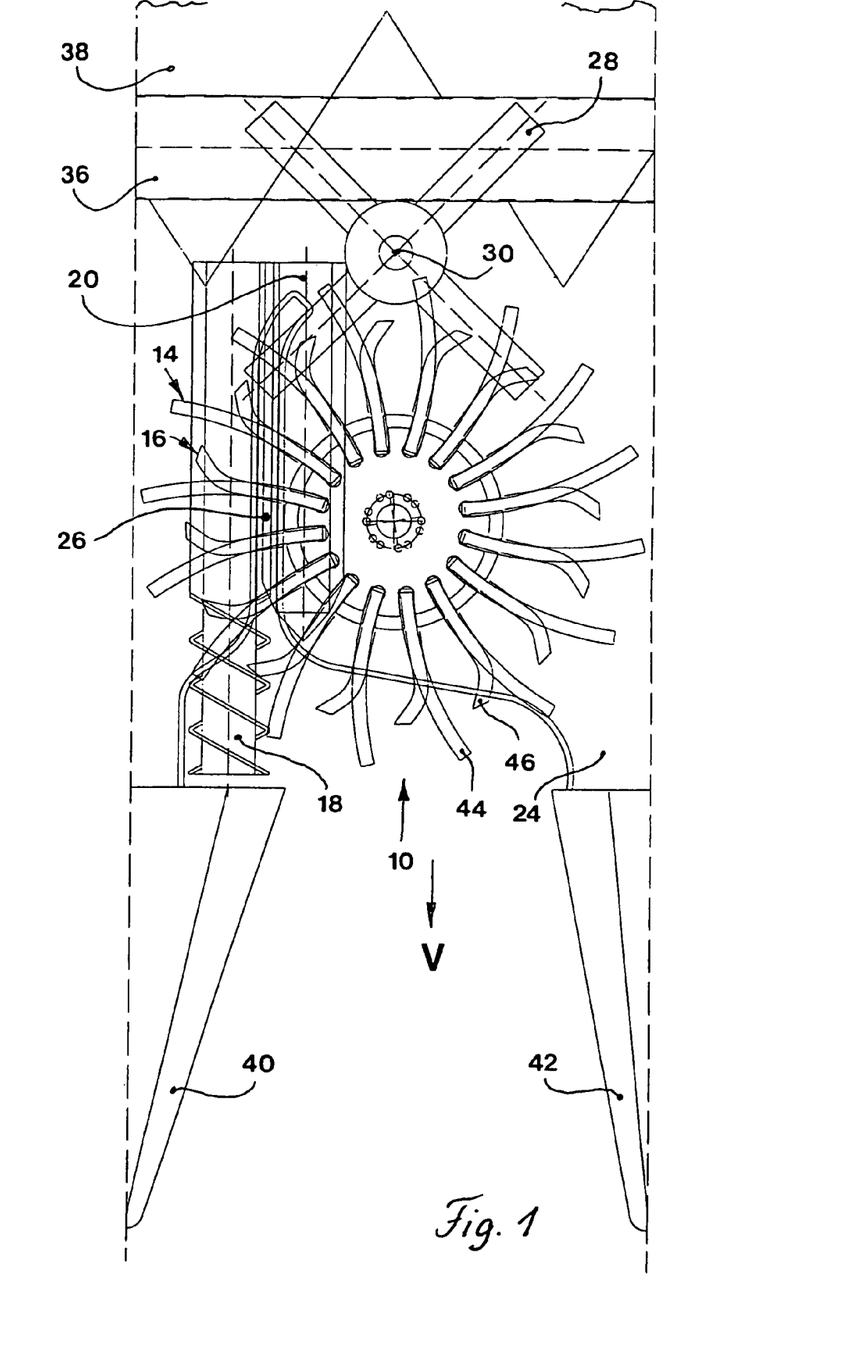
FIG. 1 is a top view of a feeding and picking device of a crop-harvesting machine.
Figure 4:
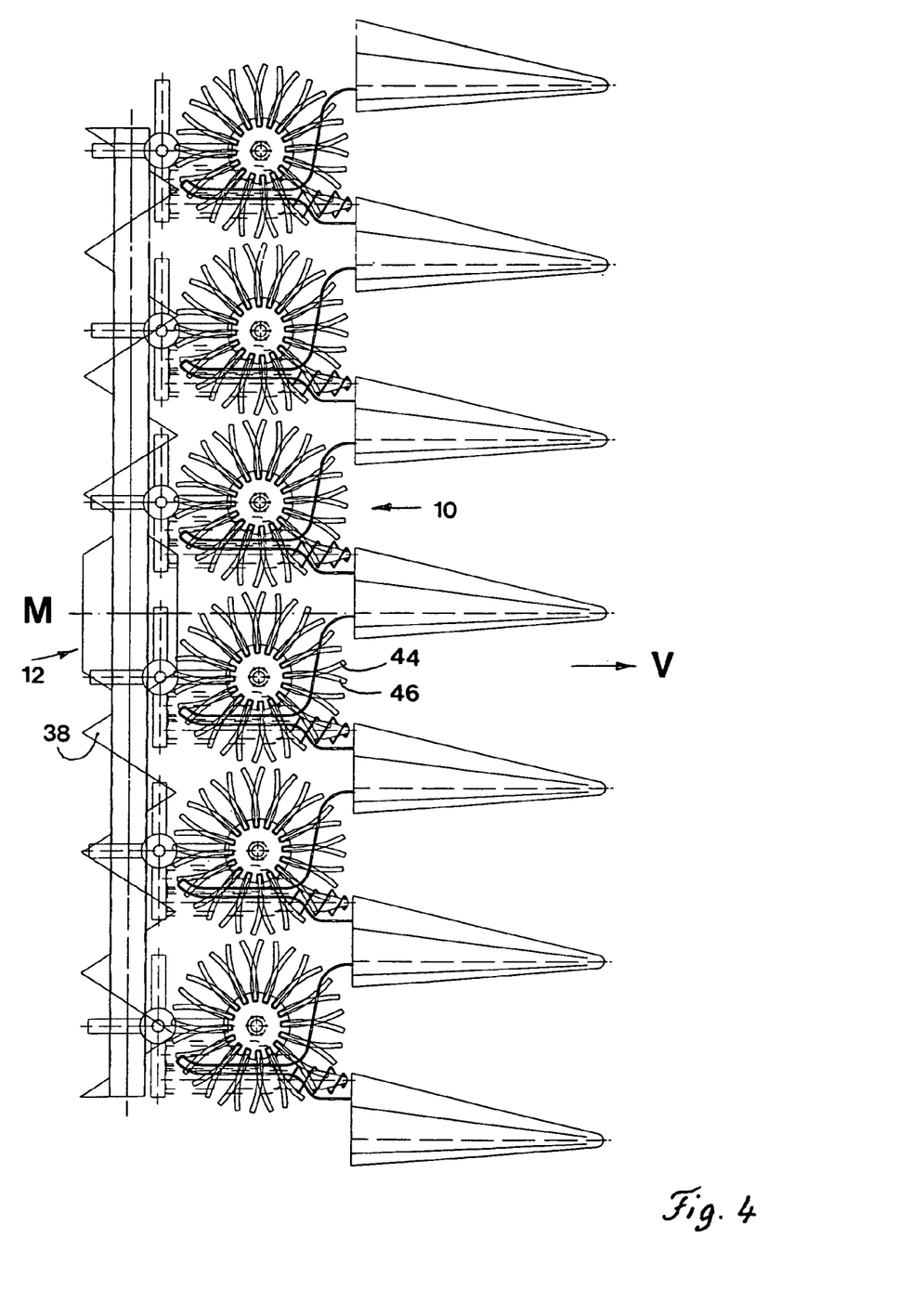
FIG. 4 is a top view of a crop-harvesting machine with a plurality of feeding and picking devices.

FIG. 1 illustrates a feeding and picking device 10 of a crop-harvesting machine. Typically, a crop harvesting machine 12, as shown in FIG. 4, comprises a plurality of feeding and picking devices 10; although, a crop harvesting machine 12 may be fitted with a single feeding and picking device 10. The feeding and picking device 10 comprises an upper feeding element 14, a lower feeding element 16, a rotary cutting knife 28, a first snapping roll 18, a second snapping roll 20, and a snapping channel 26 formed by snapping bars 24.

The upper feeding element 14 and the lower feeding element 16 grasp and draw the plant to be harvested into the crop-harvesting machine 12. These elements 14 and 16 are rotatably mounted on a vertical axis and rotate in the same direction by a drive, not shown. The upper feeding element 14 is mounted above the snapping bar 24, and the lower feeding element 16 is mounted beneath the snapping bar 24.

In the illustrated embodiments, the axes of rotation of the upper feeding element 14 and the lower feeding element 16 are parallel to one another and coaxial with one another. However, it is also conceivable for these elements to be mounted in a staggered relationship to one another and/or tilted relative to one another. The axes of rotation of the lower feeding element 16 and the upper feeding element 14 are substantially vertical, but they may also be tilted slightly forward. Looking at the upper feeding element 14 and the lower feeding element 16 from the top as shown in FIG. 1, the two elements rotate in the clockwise direction. The elements 14 and 16 are rotated at the same speed.

The basic design of the upper feeding element 14 comprises a central disk 48 having substantially radially extending fingers 44. These fingers 44 are distributed along the periphery of the disk in the same plane of the disk 48. Fingers 44 have a trailing curvature curving away from the direction of rotation. As an alternative to, or in addition to, the curvature of fingers 44, it is also conceivable for the fingers to move radially, such as used on harvesting platforms, which can be achieved by an eccentric control. The lower feeding element 16 is also constructed to comprise a central disk 50 having substantially radially extending fingers 46. These fingers 46 are distributed along the periphery of the disk in the same plane as the disk 50. Fingers 46 have a leading curvature curving forward into the direction of rotation. The fingers 46 of the lower element 16 provide a more aggressive transporting action by better grasping the plant stalks than the fingers 44 of the upper element 14.

As shown in FIG. 1, the crop harvesting machine is also provided with gathering snouts 40 and 42 that are located upstream from the feeding elements 14 and 16 in relation to the direction of forward travel V. The gathering snouts 40 and 42 push or bend plants that are not directly in the path of feeding elements 14 and 16 inward so that they are located within the radius of action of elements 14 and 16. The edge of snapping bar 24 directs the plant stalks 22 into the radius of action of feeding elements 14 and 16. The fingers 44 and 46 define the radius of action of feeding elements 14 and 16. The radius of action is large enough so that feeding and picking device 10—during its interaction with the curved leading edge of snapping bar 24 and gathering snouts 40 and 42—is able to work in fields which are not planted in rows.

A plant stalk 22 growing in the field—which may have been directed by snapping bar 24 towards the center of the feeding and picking device—first contacts fingers 44 of the upper feeding element 14 since, in this embodiment, the upper feeding element 14 has a larger diameter than the lower feeding element 16. However, the upper feeding element 14 and the lower feeding element 16 may have equally long fingers 44 and 46, as shown in several other embodiments which will be explained in greater detail below. As a result of the trailing curvature of finger 44, the stalk is pushed outward until it has passed around the tip of finger 44. The plant stalk 22 is subsequently grasped by the leading surface of a following finger 46 of the lower feeding element 16 as feeding and picking device 10 has moved forward. Normally, it will be the next finger grasping the plant stalk, however, if the speed of forward travel is low, it may also be possible for the plant stalk to pass the tip of yet another finger 44 of the upper feeding element 14. Because of the rotation of lower feeding element 16, the plant stalk subsequently moves inward along the leading surface of finger 46. In its upper region, the plant stalk is pushed by finger 46 of lower feeding element 16 against the trailing surface of finger 44 of upper feeding element 14. In the course of this process, plant stalk 22 that has not yet been separated from the ground of the field (see FIG. 6) may be bent. Thus, one finger 46 of the lower feeding element 16 and one finger 44 of the upper feeding element 14 interact to transport a stalk while forming a wedge-type space in which the plant stalk 22 is transported.

The lower feeding element 16 cooperates with the upper feeding element 14 to move the plant stalk 22 into the radius of action of the first snapping roll 18. The first snapping roll 18 is on the other side of the snapping channel 26 from the feeding elements 14 and 16. The first snapping roll 18 extends horizontally and parallel to the direction of forward travel V. Vertically, the first snapping roll 18 is mounted between snapping bar 24 and the lower feeding element 16. The front region of the first snapping roll 18 is provided with auger flighting. The auger flighting and the feeding elements 14 and 16, draw the plant stalk 22 into the snapping channel 26 which extends at least approximately parallel to the direction of forward travel V. The snapping bar 24 forms the snapping channel 26. Relative to the direction of forward travel V, the inlet of the snapping channel is located in front of the axis of rotation of feeding elements 14 and 16. The rear region of snapping channel 26 is curved towards the feeding elements 14 and 16.

Figure 3:
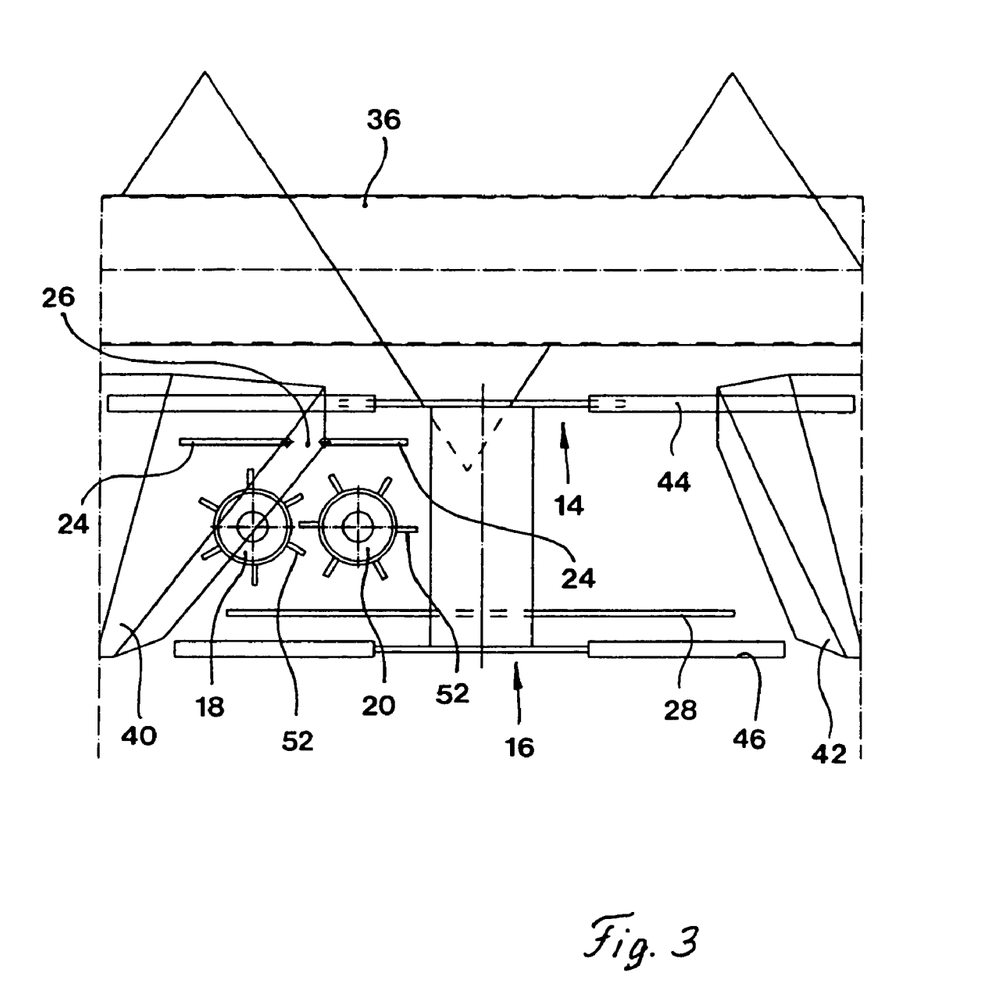
FIG. 3 is a front view of the feeding and picking device shown in FIG. 1.

The plant stalk 22 subsequently reaches the radius of action of the second snapping roll 20. The front tip of the second snapping roll is located approximately even with the axis of rotation of feeding elements 14 and 16. The second snapping roll 20 extends parallel to the first snapping roll 18. The second snapping roll is positioned between the first snapping roll 18 and the axis of rotation of feeding elements 14 and 16. The gap formed between the first and second snapping rolls 18 and 20 is located vertically beneath the snapping channel 26. The first snapping roll 18 and the second snapping roll 20 are provided with axially arranged, outward projecting gripping flutes 52, best illustrated in FIG. 3. Referring to FIG. 3, the first snapping roll 18 rotates in a clockwise direction and the second snapping roll 20 rotates in a counterclockwise direction. The first snapping roll 18 and the second snapping roll 20 cooperate and pull the plant stalk 22 downwardly. Snapping bar 24 on both sides of snapping channel 26 strips the plant stalk 22 of its useful parts, such as ears of corn 54 (see FIG. 6).

During the picking process, the upper feeding element 14 and the lower feeding element 16 ensure that the plant stalk 22 is transported throughout the length of snapping channel 26. As described earlier, the plant stalk 22 is initially caught in the wedge-type space that is formed by a finger 44 of the upper feeding element 14 and a finger 46 of the lower feeding element 16. For the major portion of the picking process, the plant stalk 22 remains in this wedge-type space. A chopping knife 28 chops the plant stalk 22 in the downstream end of snapping channel 26. The plant stalk 22 is driven by the following finger 44 of the upper feeding element 14 through snapping channel 26. The speeds of snapping rolls 18 and 20 and of feeding elements 14 and 16 are preferably chosen to ensure that the entire plant stalk 22 has been drawn downward into snapping channel 26 once the end of snapping channel 26 is reached.

Through the rotation of the fingers 44 of the rotating upper feeding element 14 and pushed by immediately following plant stalks 22, the separated useful parts of the plant are moved into a trough 38 on the rear of the feeding and picking device 10. From this trough 38 the useful parts enter into the radius of action of a screw conveyer 36 which is transverse to the direction of forward travel V. The screw conveyer 36 transports the useful parts into a conventionally known machine, not shown, for further processing, such as into a combine harvester with a threshing device, or a field shredder with a chopping device, or a device that transports them into a trailer or a similar vehicle.

The remainder of plant stalk 22 which is transported downward by snapping rolls 18 and 20 enters into the radius of action of a rotating four-arm chopping knife 28 which chops the remainder of the plant into pieces. Thus, the chopped remainder of the plant is deposited on the field. Plant 22—at least during the first cut separating it from the ground—is supported by the first feeding element 16 forming a counterknife. In addition, snapping rolls 18 and 20 support the plant 22 during the chopping process.

The chopping knife 28 rotates around a vertical chopping axis 30 that in the illustrated embodiment is located between the feeding axis of the feeding elements 14 and 16 and screw conveyer 36. In the vertical direction, the chopping knife 28 is positioned between snapping rolls 18 and 20 and the lower feeding element 16. As seen in FIG. 1, chopping knife 28 rotates in a clockwise direction so that the chopped material is ejected from the side and is propelled rearwardly.

Figure 2:
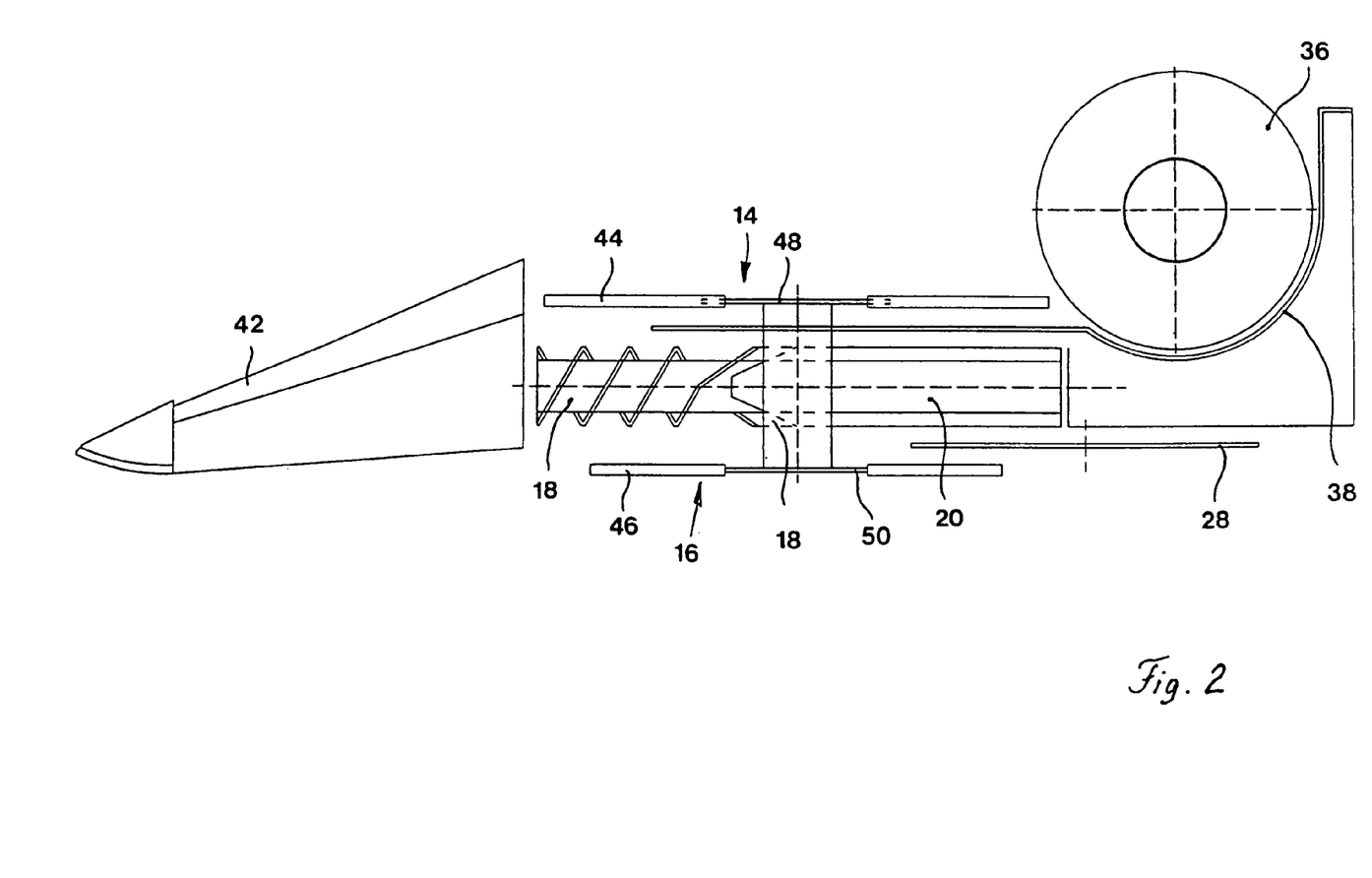
FIG. 2 is a side view of the feeding and picking device shown in FIG. 1.

FIG. 4 shows an overall view of a crop harvesting machine 12 with a total of six feeding and picking devices 10 each of which correspond to those shown in FIGS. 1 through 3. The sole difference being that the length of fingers 44 of the upper feeding element 14 (at least approximately) corresponds to the length of fingers 46 of lower feeding element 16. Relative to the direction of forward travel V, all snapping channels 26 are mounted on the right side of the axes of rotation of feeding elements 14 and 16. Screw conveyer 38 transports the useful parts of plant 22 in the direction of the center axis M of crop harvesting machine 12, from where they are transported elsewhere for further processing. It can therefore be useful if a feederhouse of a combine harvester or the feeding region of a field shredder were to be attached to the rear end of crop harvesting machine 12. The useful feature of the embodiment shown here is that all feeding and picking devices 10 have the same construction, which keeps the production cost low.

Figure 5:
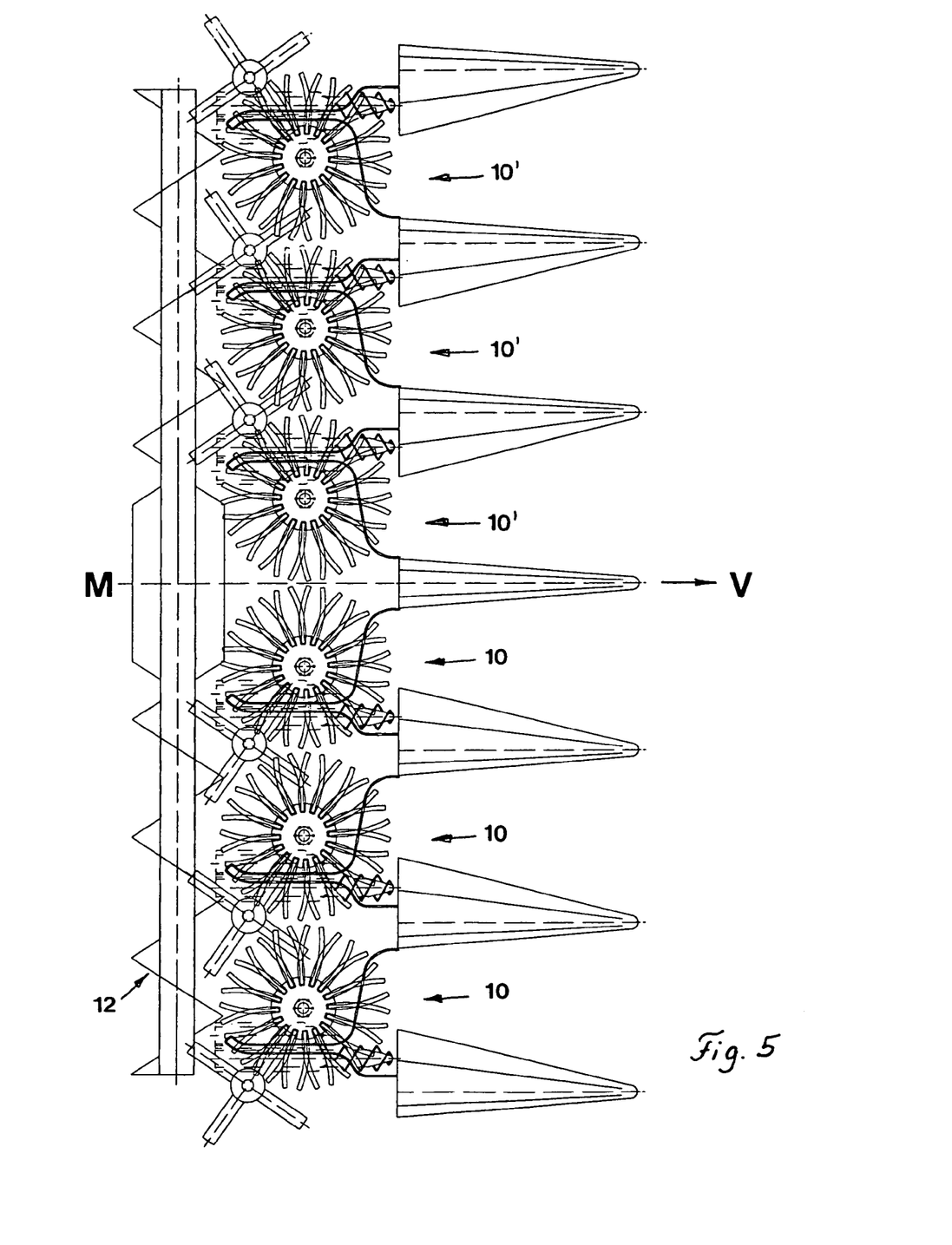
FIG. 5 is a top view of a different embodiment of a crop-harvesting machine.

In contrast, in the embodiment illustrated in FIG. 5, two different types of feeding and picking devices 10 are used. The three feeding and picking devices 10 located on the right side of the center line M of crop harvesting machine 12 are symmetrical with the three hand side devices 10'. In the left side feeding picking devices 10', the snapping channel 26 and snapping rolls 18 and 20 are mounted to the left of feeding elements 14 and 16 while in the right side feeding and picking devices 10 the snapping channel 26 and the snapping rolls 18 and 20 are mounted to the right of the feeding elements 14 and 16. The direction of rotation of feeding elements 14 and 16 differs as well. The feeding elements 14 and 16 for right side devices 10 rotate clockwise, and feeding elements 14 and 16 of left side devices 10' rotate counterclockwise. An advantage of the second embodiment is that, due to the symmetrical distribution of mass of feeding and picking devices 10, 10', no lateral torsional moments act on the vehicle to which crop harvesting machine 12 is attached.

Figure 6:
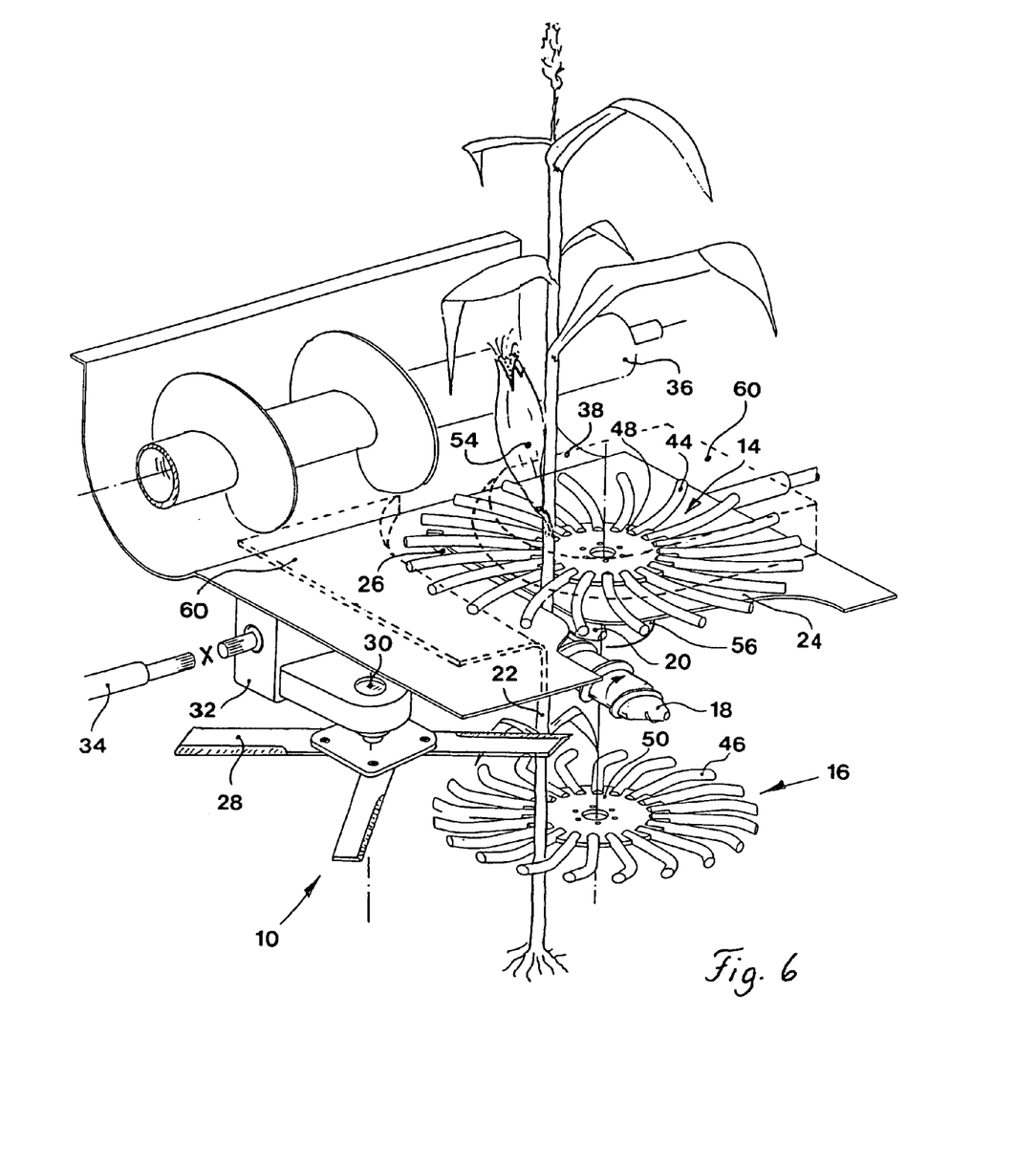
FIG. 6 is a perspective view of a different embodiment of a feeding and picking device.

FIG. 6 is a perspective view of a feeding and picking device 10 in which the position of chopping knife 28 differs from the previous embodiments. The vertical axis of rotation 30 of chopping knife 28 is located on the side of the first snapping roll 18 opposite to feeding elements 14 and 16. The axis of rotation 30 is located approximately between screw conveyer 36 and the axis of rotation of feeding elements 14 and 16. Chopping knife 28 is made to rotate by a gear unit 32 being driven by traverse driving shaft 34. Drive shaft 34 also serves to drive snapping rolls 18 and 20 and feeding elements 14 and 16 that are supported on a supporting arm 56. For reasons of clarity the intervening power transmission elements are not shown in the drawing. It is possible to use only one traverse drive shaft 34 for the entire crop harvesting machine 12 although it is useful in most cases to provide more than one drive shaft on both sides of the feeding device. As in FIGS. 1–3, the diameter of the lower feeding element 16 in FIG. 6 is smaller than that of the upper feeding element 14. A cover 60 is located above snapping bar 24 and corresponding to the snapping channel 26. The cover 60 defines a channel through which the useful parts of the plants are transported to screw conveyer 36. In addition, cover 60 protects the upper feeding element 14 against accidental contact. Cover 60 can also be used in any of the other embodiments of the present invention.

Feeding and picking device 10 is preferably attached to a support (not shown in the figures) so it can be adjusted laterally. The gear unit 32, snapping rolls 18 and 20, snapping bar 24, gathering snouts 40 and 42, and supporting arm 56 with feeding elements 14 and 16 would be mounted on a mounting device that can be adjustably positioned on a transversely extending support. Any gaps between snapping bars 24 of adjacent feeding and picking devices 10 that may form in the course of the adjustment can be covered by suitable plates or similar devices. This adjustability feature can be incorporated into all embodiments, not only in the one presented in FIG. 6.

Figure 7:
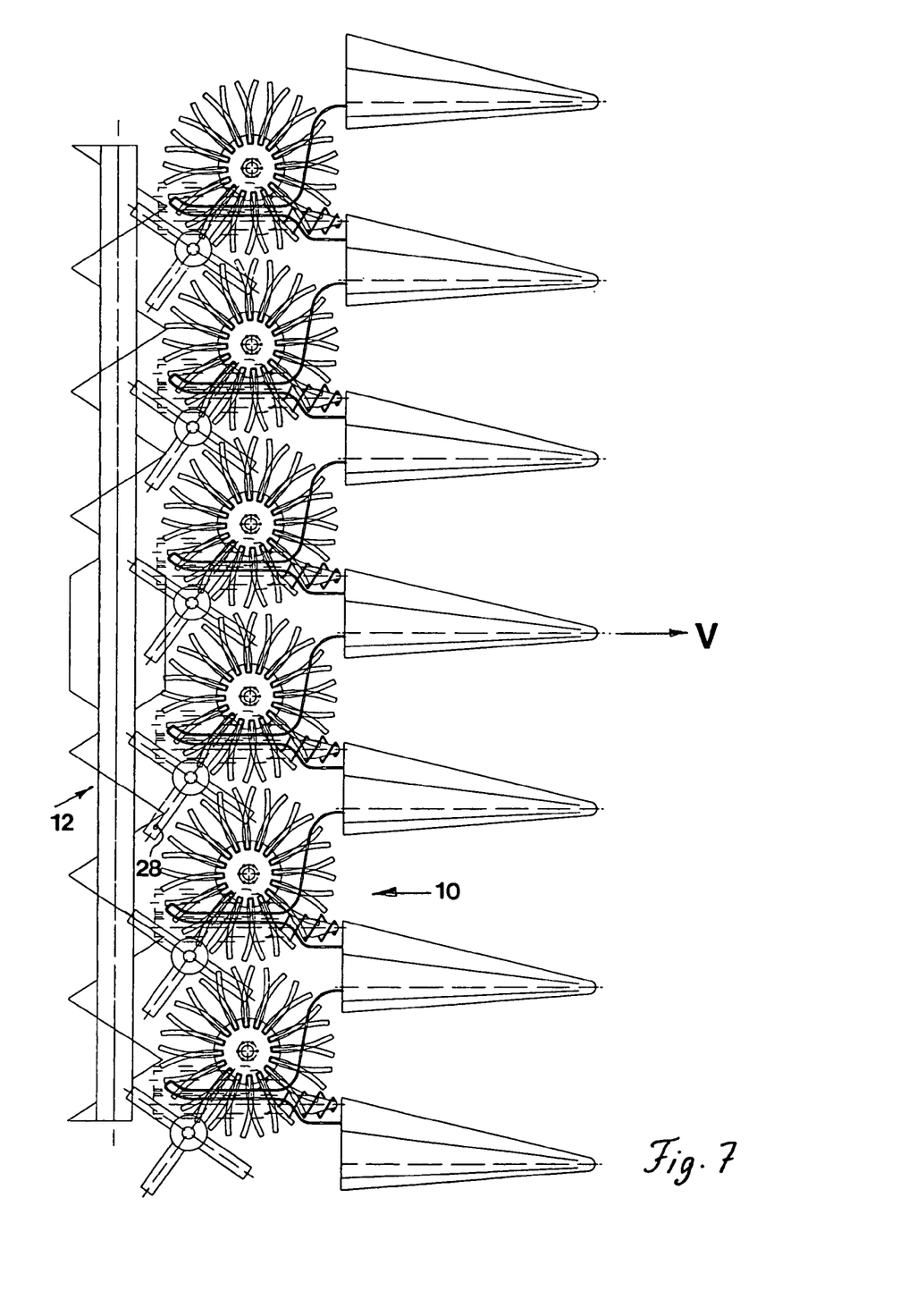
FIG. 7 is another crop harvesting machine with a plurality of feeding and picking devices that are similar to those shown in FIG. 6.

Crop harvesting machine 12 shown in FIG. 7 corresponds substantially to that shown in FIG. 4; however, the feeding and picking devices 10 used are identical to those shown in FIG. 6. The axes of rotation 30 of chopping knives 28 are therefore not mounted behind feeding elements 14 and 16, but instead are located on the side next to the first snapping roll 18. In contrast to FIG. 6, the diameters of the upper feeding elements 14 and the lower feeding elements 16 are identical.

Figure 8:
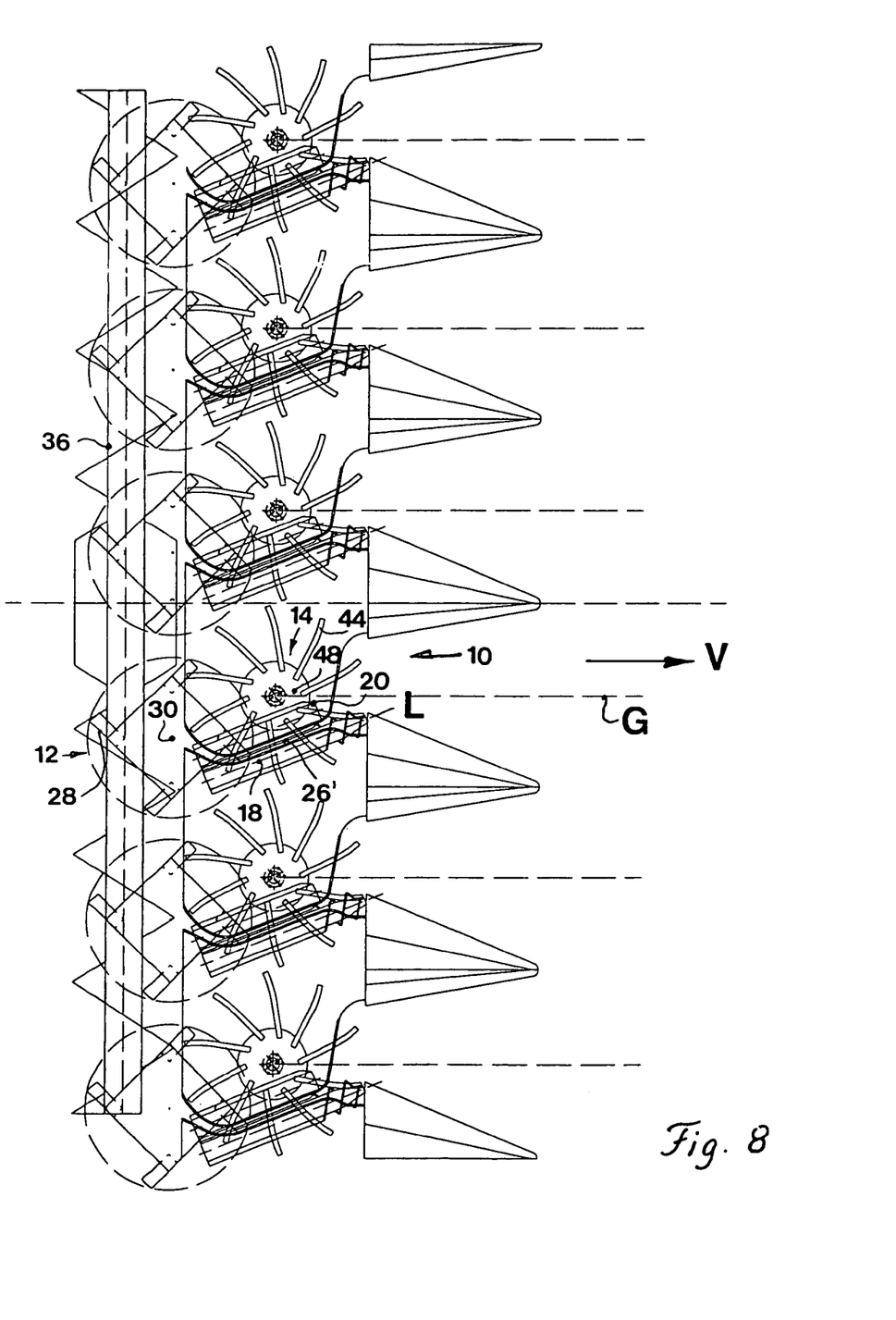
FIG. 8 is a top view of a different embodiment of a crop-harvesting machine.

FIG. 8 shows a crop-harvesting machine 12 with six feeding and picking devices 10. In this embodiment, the snapping channels 26' extend at an angle relative to the direction of forward travel V. The first snapping roll 18 and the second snapping roll 20 form an angle with the direction of forward travel V. The gap formed by the adjoining snapping rolls 18 and 20 is located under snapping channel 26'. Longitudinal axis L of snapping channel 26' forms an angle with an imaginary straight line G which extends parallel to the direction of forward travel V and through the axis of rotation of the upper feeding element. The point of intersection of longitudinal axis L with straight line G is located in front of the axis of rotation of the upper feeding element. In the snapping channel 26', plant stalks 22 are gradually transported away from straight line G. As a result of the angled snapping channel 26', the plant stalks 22 are not only transported rearwardly but also laterally. The effective length of snapping channel 26' remains the same, except that the overall length of feeding and picking device 10 is shortened, which has the advantage that the torsional force with which crop harvesting machine 12 acts upon the vehicle to which it is attached is reduced. The rear of the otherwise straight snapping channel 26', however, is again curved in the direction of straight line G.

In the fore/aft direction the axis of rotation 30 of the four-arm chopping knives 28 is located in the vicinity of the front edge of screw conveyer 36. In the transverse direction, axis of rotation 30 of chopping knife 28 is located in the vicinity of the rear end of snapping channel 26.

In FIG. 8, six identical feeding and picking devices 10 are used. The advantage is to be seen in the favorable production cost. In this context, it should be noted that for reasons of clarity, the lower feeding elements 16 are not shown FIGS. 8 and 9.

Figure 9:
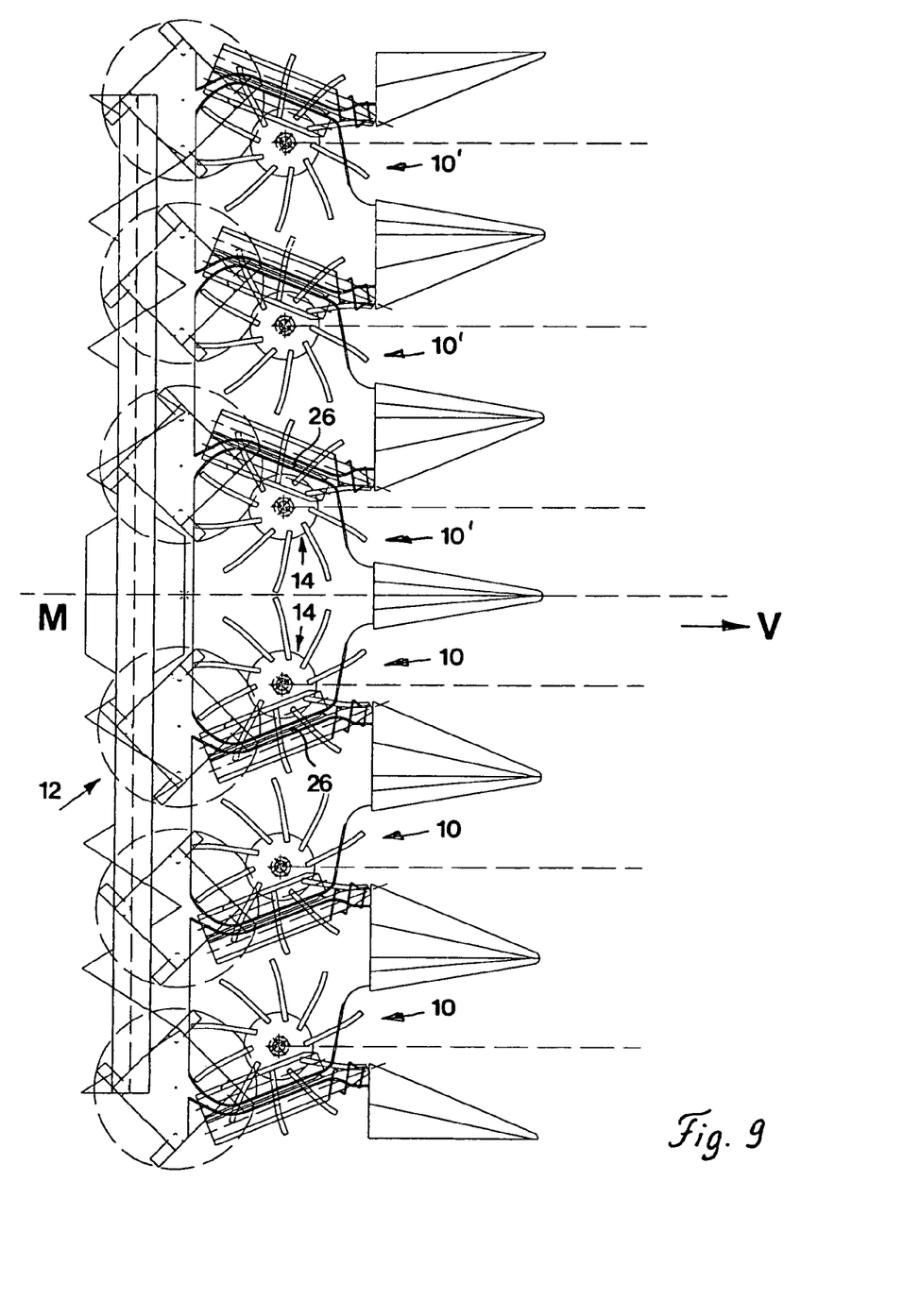
FIG. 9 is a top view of yet another embodiment of a crop-harvesting machine.
Figure 10:
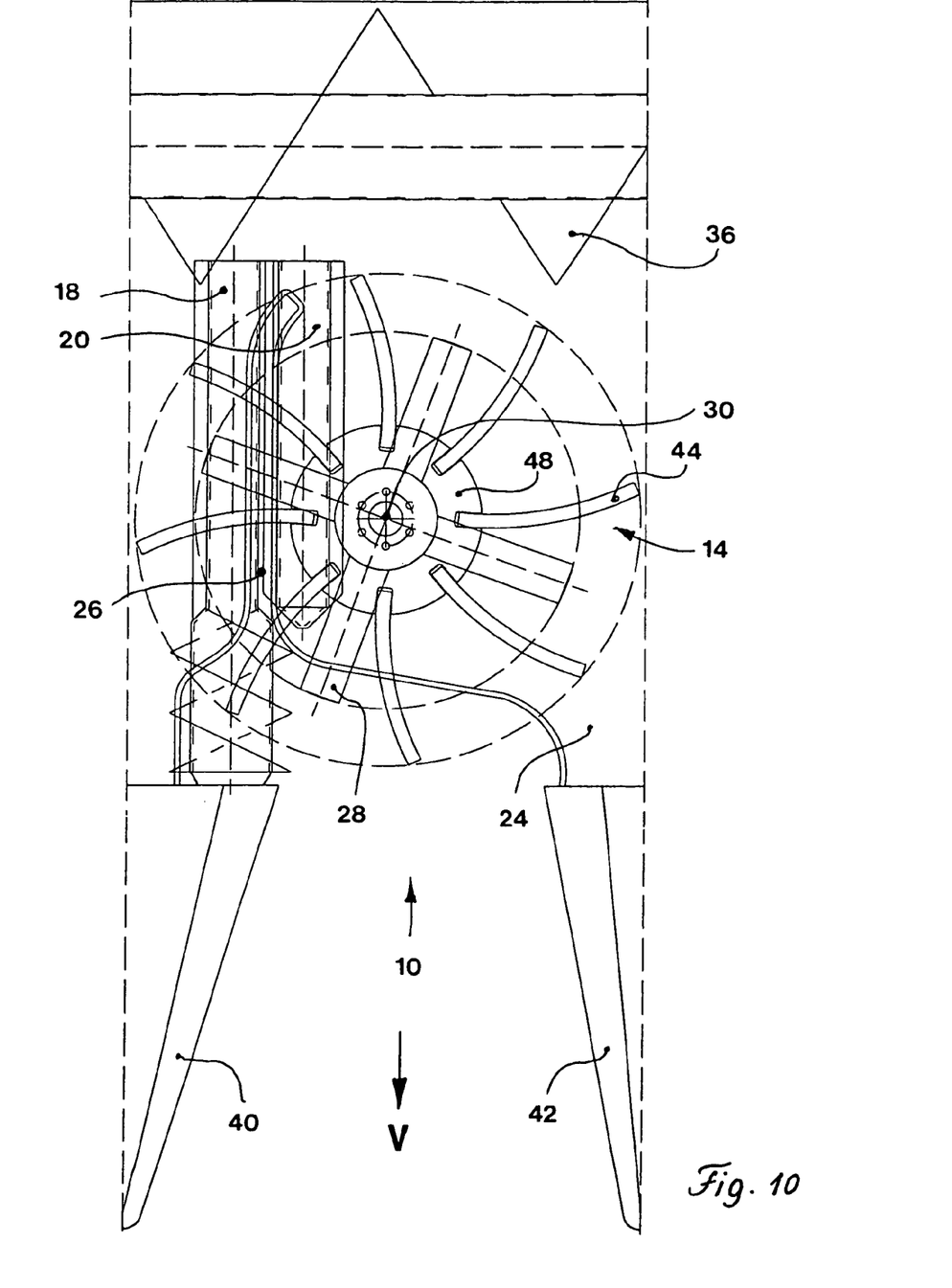
FIG. 10 is a top view of a different embodiment of a feeding and picking device.
Figure 11:
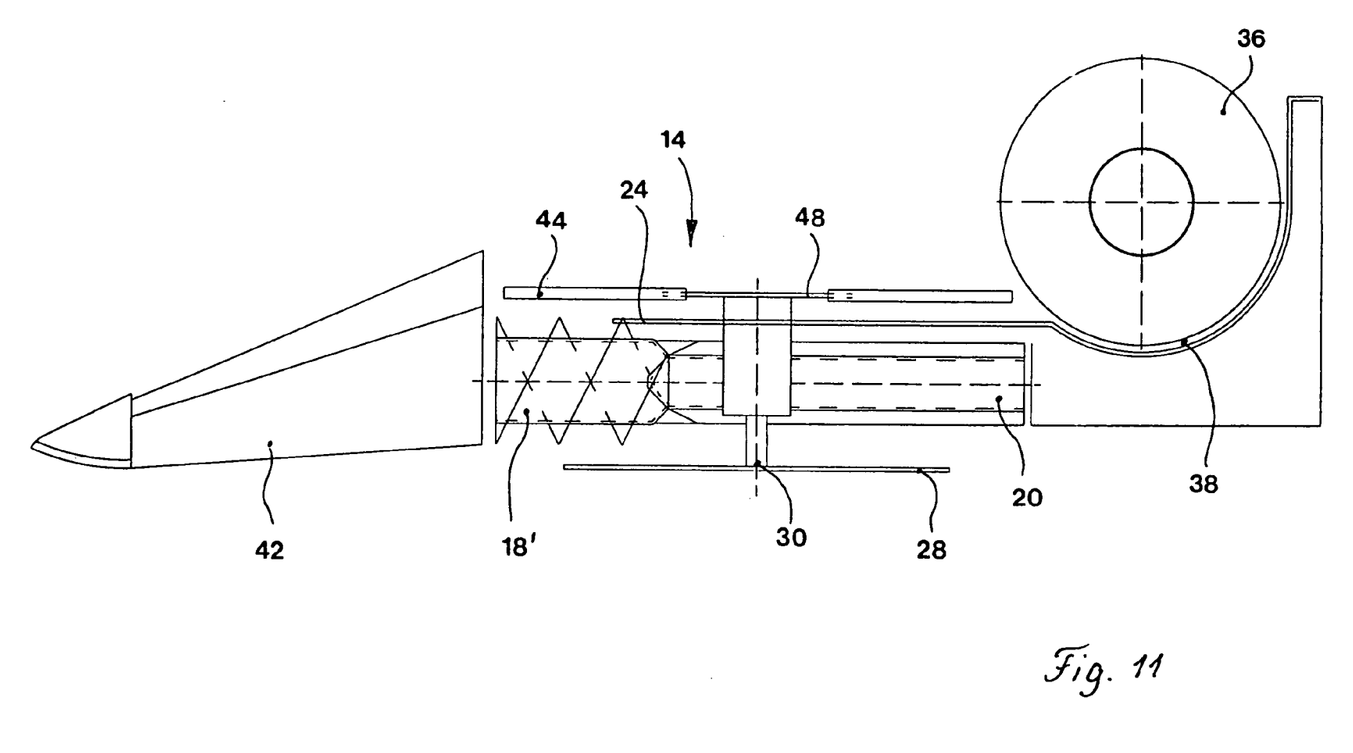
FIG. 11 is a side view of the feeding and picking device shown in FIG. 10.

The crop-harvesting machine 12 that is shown in FIG. 9 has two different types of feeding and picking devices 10. The left three feeding and picking devices 10' mounted to the left of the center line M are symmetrically arranged with respect to the right three feeding and picking devices 10 that are mounted to the right of center line M. In each of the three left feeding and picking devices 10', the snapping channel 26 is located to the left of the upper feeding elements 14. In each of the three right feeding and picking devices 10 the snapping channel is located to the right of the upper feeding elements 14. Relative to centerline M, all other structural elements of feeding and picking devices 10 and 10' are symmetrically arranged with respect to one another. The feeding and picking devices 10 correspond to those shown in FIG. 8. The feeding elements 14 and 16 for the right feeding and picking devices 10 rotate in a clockwise direction. The feeding elements 14 and 16 for the left feeding and picking devices 10' rotate in a counterclockwise direction. As with the embodiment illustrated in FIG. 5, the advantage of a symmetrical arrangement of the feeding and picking devices is that the masses on both sides of the center line are uniformly distributed, thus ensuring that no undesirable torsional forces act on the vehicle to which crop harvesting machine 12 is attached.

Figure 12:
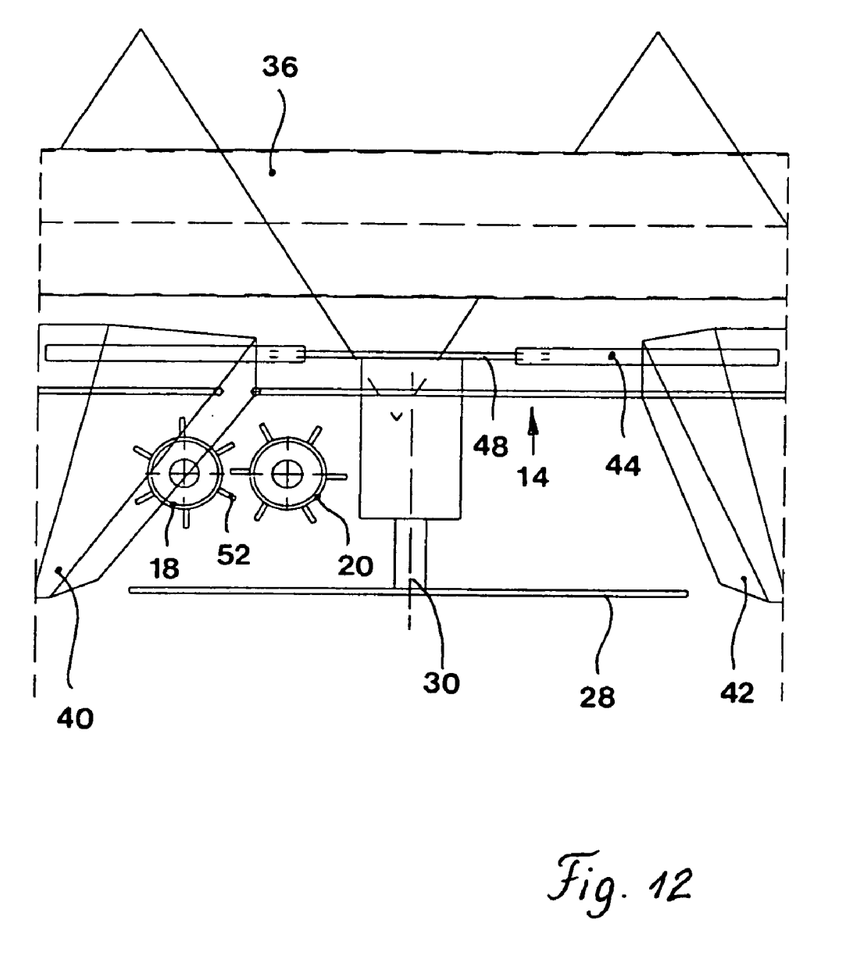
FIG. 12 is a front view of the feeding and picking device shown in FIG. 10.
Figure 13:
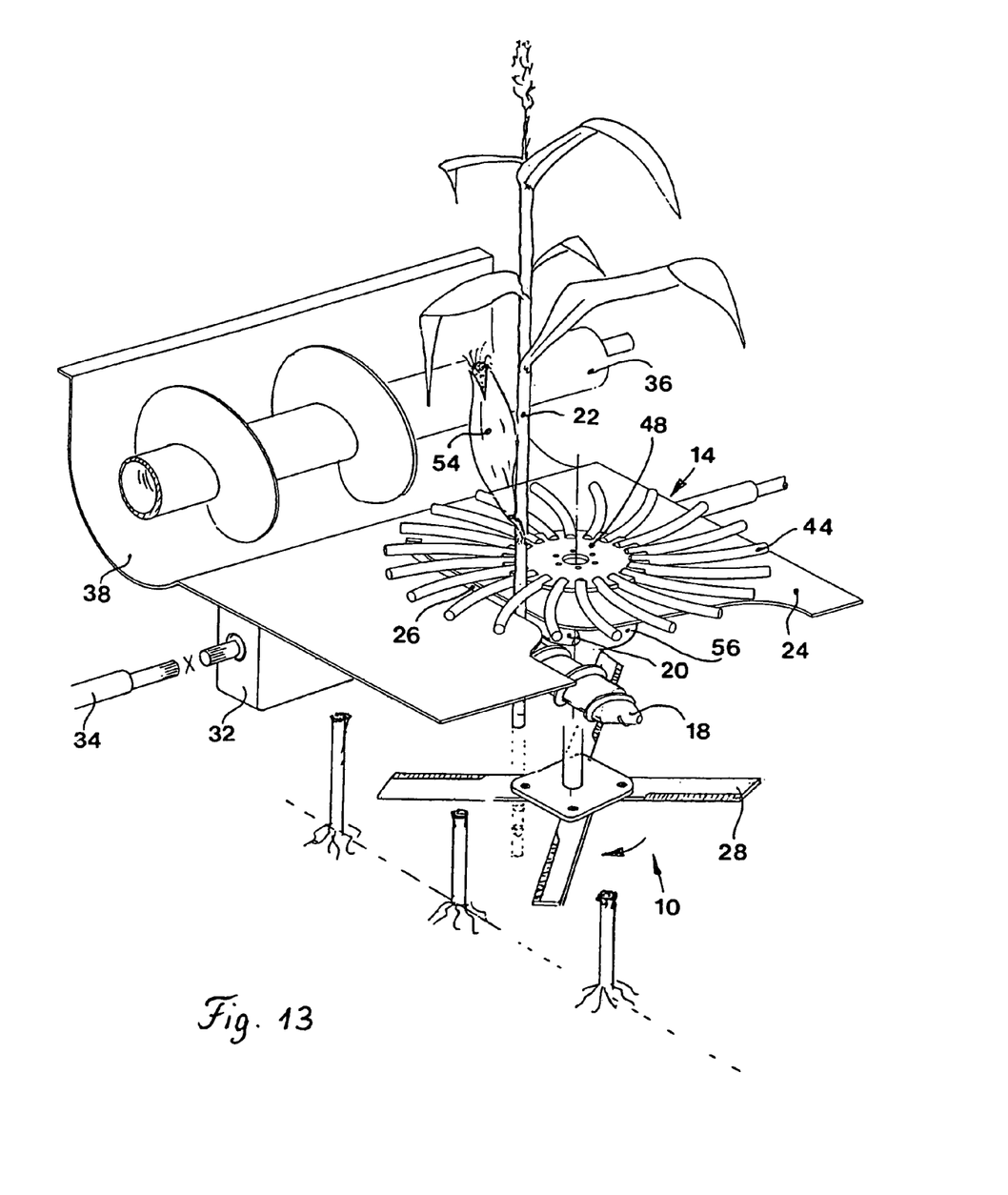
FIG. 13 is a perspective view of the feeding and picking device shown in FIGS. 10–12.

The embodiment illustrated in FIGS. 10–13 differs from the embodiment of feeding and picking device 10, mainly in that the chopping knife 28 has taken the place of the lower feeding element 16. Chopping knife 28 is therefore mounted on the same axis below the upper (and now sole) feeding element 14. In the vertical direction, the chopping knife, as seen in FIG. 12, is located beneath the snapping rolls 18 and 20.

Chopping knife 28 rotates around a vertical axis 30, around which also feeding element 14 rotates. The chopping knife 28 has a smaller diameter than that of feeding element 14. The speed of the chopping knife 28 is considerably higher than that of feeding element 14, however, the direction of rotation is the same. During harvesting the plant stalks contact the clockwise rotating feeding element 14 after they may have been bent to the side by gathering snouts 40 and 42. As a result of the rejecting transporting action of the leading edge of fingers 44, the stalks are pushed outward rather than being drawn inward. When feeding and picking device 10 further ingests the plant stalk by forward movement of the vehicle, the plant stalk is moved into the radius of action of chopping knife 28 which separates it from its root which remains in the ground. Due to its mass moment of inertia, the plant remains upright, but subsequently leans against the trailing edge of one of fingers 44. This finger rotates in the direction of snapping channel 26 in such a way that the plant is slightly tilted where it is grasped by the front end of the first snapping roll 18. The second snapping roll 20 acts as a discharging mechanism, thus ensuring that the plant, as already described for the previously explained embodiments of the present invention, is pulled through the snapping rolls 18 and 20. When the plant is in the snapping channel, it is driven by the leading edge of the following finger 44 of feeding element 14 throughout the length of snapping channel 26. The useful parts of the plant, such as ears of corn 54, are separated by snapping bar 24 and, through the action of feeding element 14, transported to trough 38, from whence screw conveyer 36 transports them to a harvester vehicle.

At the same time, the lower part of the plant is chopped off by chopping knife 28. Before it reaches snapping channel 26, the plant stalk falls gradually downward due to the force of gravity; the chopping knife chops the lower parts of the plant stalk. Once the plant has been introduced into snapping channel 26, it is gradually drawn downward by snapping rolls 18 and 20 and chopped beneath the snapping rolls by chopping knife 28.

Except for the different position and working mechanism of the chopping knife, the feeding and picking device shown in FIGS. 10–13 works in the same way as in the practical examples described previously.

The present invention should not be limited to the above-described embodiments but should be limited solely by the claims that follow.

We claim:

1. A feeding and picking device for feeding and picking a standing agricultural crop wherein individual plants in the crop are provided with plant stalks, the device comprising a rotating feeding device having a feeding radius, the rotating feeding element grasp plant stalks and directs the plant stalks to a picking device which separates useable parts from the plant stalks, a chopping device chops the plant stalks, the chopping device has a chopping radius that overlaps the feeding radius of the feeding device.

2. A feeding and picking device as defined by claim 1 wherein the feeding device acts as a counterknife to the chopping device.

3. The feeding and picking device as defined by claim 1 wherein the picking device has a length and the chopping radius of the chopping device extends throughout the length of the picking device.

4. The feeding and picking device as defined by claim 3 wherein the chopping radius of the chopping device extends to an area upstream from the picking device.

5. The feeding and picking device as defined by claim 1 wherein the chopping device has a chopping axis and the feeding axis of the feeding device correspond to one another.

6. The feeding and picking device as defined by claim 1 wherein the picking device has a rear end and the chopping device is mounted on the rear end of the picking device.

7. The feeding and picking device as defined by claim 1 wherein the feeding device is provided with an upper feeding element which is mounted above the picking device.

8. The feeding and picking device as defined by claim 1 wherein the feeding device is provided with a lower feeding element which is mounted beneath the chopping device.

9. The feeding and picking device as defined by claim 1 wherein the feeding device is provided with an upper feeding element and a lower feeding element, and the chopping device is provided with at least one chopping knife, the chopping knife being located between the upper and lower feeding elements.

10. The feeding and picking device as defined by claim 9 wherein at least one of the lower feeding element and the upper feeding element is designed to transport grasped plants throughout the length of the picking device.

11. The feeding and picking device as defined by claim 10 wherein the upper feeding element has a leading surface with a rejecting transporting action and a trailing surface with an aggressive transporting action.

12. The feeding and picking device as defined by claim 11 wherein the chopping device has a chopping axis and the feeding axis of feeding device are approximately parallel to one another.

13. The feeding and picking device as defined by claim 12 wherein the chopping axis is substantially vertical.

14. The feeding and picking device as defined by claim 13 wherein the chopping device rotates in a chopping direction and the feeding device rotates in a feeding direction, the chopping direction and the feeding direction are identical.

15. The feeding and picking device as defined by claim 13 wherein the chopping device rotates in a chopping direction and the feeding device rotates in a feeding direction, the chopping direction and the feeding direction are opposite.

16. The feeding and picking device as defined by claim 13 wherein the chopping knife has a front cutting edge and a rear cutting edge.

17. The feeding and picking device as defined by claim 13 wherein the chopping knife is rigidly mounted to the chopping device.

18. The feeding and picking device as defined by claim 13 wherein the chopping knife is suspended from the chopping device so that it oscillates.

19. The feeding and picking device as defined by claim 13 wherein the chopping knife has a smooth edge.

20. The feeding and picking device as defined by claim 13 wherein the chopping knife has a splicing knife.

21. The feeding and picking device as defined by claim 1 further comprising a guiding mechanism for depositing chopped plant material in the form of a windrow.

* * * * *